US005518825A

United States Patent [19]

Murayama et al.

[11] Patent Number: 5,518,825

[45] Date of Patent: May 21, 1996

[54] ORGANIC ELECTROLUMINESCENT DEVICE

[75] Inventors: Ryuji Murayama, Tsurugashima; Shigeo Yamamura; Masaaki Ikeda, both of Tokyo, all of Japan

[73] Assignees: Pioneer Electronic Corporation; Nippon Kayaku Kabushiki Kaisha, both of Tokyo, Japan

[21] Appl. No.: 305,990

[22] Filed: Sep. 19, 1994

[30] Foreign Application Priority Data

Sep. 20, 1993 [JP] Japan .................................... 5-233528

[51] Int. Cl.$^6$ .................................... B32B 9/00

[52] U.S. Cl. .......................... 428/690; 428/457; 428/691; 428/704; 428/917; 313/502; 313/504; 313/506

[58] Field of Search .................................... 428/690, 691, 428/704, 917, 457; 313/504, 506, 502

[56] References Cited

U.S. PATENT DOCUMENTS

| | | | |
|---|---|---|---|
| 4,769,292 | 9/1988 | Tang et al. | 428/690 |
| 5,281,489 | 1/1994 | Mori et al. | 428/690 |

FOREIGN PATENT DOCUMENTS

| | | |
|---|---|---|
| 6-17047 | 1/1994 | Japan . |

*Primary Examiner*—Patrick J. Ryan
*Assistant Examiner*—Marie R. Yamnitzky
*Attorney, Agent, or Firm*—Foley & Lardner

[57] ABSTRACT

An organic electroluminescent device comprises an anode, a positive-hole transport layer, an emitting layer, (an electron transport layer) and a cathode which are layered in sequence, wherein the emitting layer (and/or the electron transport layer) comprises at least one of dioxazine compounds or diazine compounds. The emitting capability of the organic electroluminescent device is improved in luminance and efficiency upon application of a low voltage.

17 Claims, 7 Drawing Sheets

ORGANIC ELECTROLUMINESCENT DEVICE

BACKGROUND OF THE INVENTION

1. Field of the invention

The present invention relates to an electroluminescent device (hereinafter referred as "EL device") having an emitting layer made of an emitting substance, which utilizes an electroluminescence phenomenon that is the emission of light resulting from application of an electric field or the electrons to the substance. More particularly, it is concerned with an organic EL device comprising an anode, a positive-hole transport layer made of an organic compound, an emitting layer made of both an organic compound, and a cathode, and the same EL device further comprising an electron transport layer interposed between the cathode and the emitting layer.

2. Description of the prior art

As organic EL devices, there have been known a device of two-layer structure type having two layers made of organic compounds respectively as shown in FIG. 1, in which an organic fluorescent thin film 3 (hereinafter referred as "emitting layer") and an organic positive-hole transport layer 4 are laminated with each other and are arranged between a metal cathode 1 and a transparent anode 2. There have been also known a device of three-layer structure type having three layers made of organic compounds respectively as shown in FIG. 2, in which an organic electron transport layer 5, an emitting layer 3 and an organic hole transport layer 4 are laminated in sequence and are sandwiched as a whole between a metal cathode 1 and a transparent anode 2.

The hole transport layer 4 facilitates the infusion of the holes from the anode and blocks electrons. The electron transport layer 5 facilitates the infusion of electrons from the cathode.

In these organic EL devices, a glass substrate 6 is furnished outside the transparent anode 2. The recombination of electrons injected from the metal cathode 1 and the holes injected from the transparent anode 2 to the emitting layer 3 generates excitons. The excitons emit light when they are deactivated through radiation. This light radiates toward outside through the transparent anode 2 and the glass substrate 6.

However, there is not combination of materials for the emitting layer have a sufficient luminance and a long life time of emission yet, even though there is an organic EL device comprising an emitting layer made of a pyran compound (this is so called "DCM"), for example, radiating red light with a comparably high luminance. There is a demand for an EL device capable of a high luminance emission.

The present invention has been made to meet such a demand. An object of the invention is therefore to provide an organic EL device capable of emitting light at a high luminaries and achieving a long time life emission.

SUMMARY OF THE INVENTION

An organic EL device according to the present invention comprises an anode, a positive-hole transport layer made of an organic compound, an emitting layer made of an organic substance, and a cathode which are layered in sequence, wherein the emitting layer (this should be read as "the emitting layer or the electron transport layer" when the device further comprises an electron transport layer interposed between the cathode and the emitting layer.) comprises at least one of dioxazine compounds represented by the following formula (1):

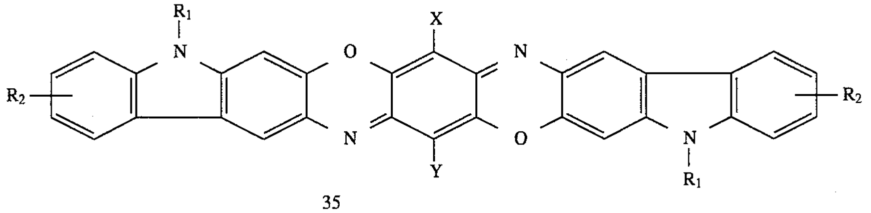

(1)

where X and Y denote independently a hydrogen atom, a halogen atom, or a substituted or unsubstituted phenylthiol group, $R_1$ denotes a hydrogen atom, an alkyl group of from 3 to 18 carbon atoms, an alkoxyalkyl group of from 1 to 8 carbon atoms, or a benzyl group, and $R_2$ denotes a hydrogen atom, a halogen atom, a cyano group, a nitro group, an alkyl group of from 1 to 8 carbon atoms, or an alkoxy group of from 1 to 5 carbon atoms.

An organic EL device according to the present invention comprises an anode, a positive-hole transport layer made of an organic compound, an emitting layer made of an organic substance, and a cathode which are layered in sequence, wherein the emitting layer (this should be read as "the emitting layer or the electron transport layer" when the device further comprises an electron transport layer interposed between the cathode and the emitting layer.) comprises at least one of dioxazine compounds represented by the following formula (2):

(2)

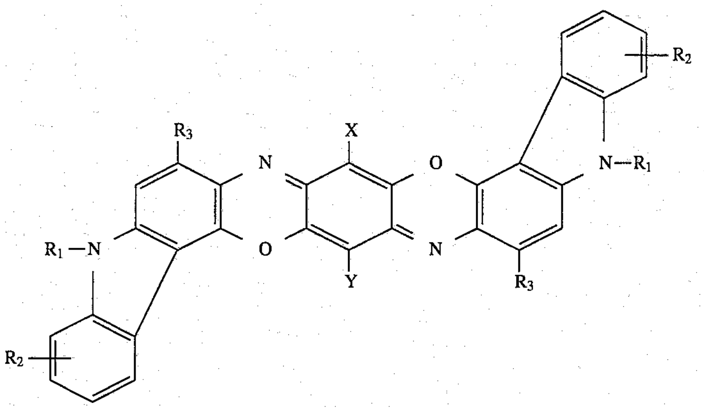

where X and Y denote independently a hydrogen atom, halogen atom, or a substituted or unsubstituted phenylthiol group, $R_1$ denotes a hydrogen atom, an alkyl group of from 3 to 18 carbon atoms, an alkoxyalkyl group of from 1 to 8 carbon atoms, or a benzyl group, $R_2$ denotes a hydrogen atom, a halogen atom, a cyano group, a nitro group, an alkyl group of from 1 to 8 carbon atoms, or an alkoxy group of from 1 to 5 carbon atoms, and $R_3$ denotes a hydrogen atom, a halogen atom, an alkyl group of from 1 to 12 carbon atoms, or an alkoxy group of from 1 to 12 carbon atoms.

An organic EL device according to the present invention comprises an anode, a positive-hole transport layer made of an organic compound, an emitting layer made of an organic substance, and a cathode which are layered in sequence, wherein the emitting layer (this should be read as "the emitting layer or the electron transport layer" when the device further comprises an electron transport layer interposed between the cathode and the emitting layer.) comprises at least one of dioxazine compounds represented by the following formula (3):

(3)

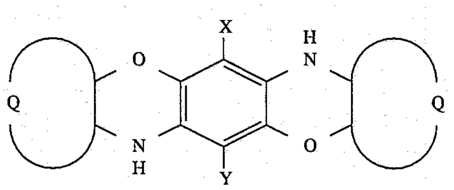

where X and Y denote independently a hydrogen atom, a halogen atom, or a substituted or unsubstituted phenylthiol group, and Q denotes a residual group of naphthalene ring substituted or unsubstituted by a hydrogen atom, a halogen atom, a cyano group, a nitro group, or an alkoxy group of from 1 to 5 carbon atoms.

The dioxazine compounds represented by the above formula (3) includes one represented by the following formula (4):

(4)

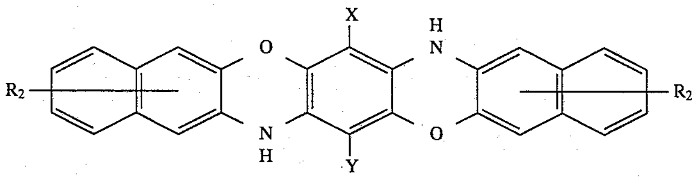

where X and Y denote independently a hydrogen atom, a halogen atom, or a substituted or unsubstituted phenylthiol group, and $R_2$ denotes a hydrogen atom, a halogen atom, a cyano group, a nitro group, an alkyl group of from 1 to 8 carbon atoms, or an alkoxy group of from 1 to 5 carbon atoms.

An organic EL device according to the present invention comprises an anode, a positive-hole transport layer made of an organic compound, an emitting layer made of an organic substance, and a cathode which are layered in sequence, wherein the emitting layer (this should be read as "the emitting layer or the electron transport layer" when the device further comprises an electron transport layer interposed between the cathode and the emitting layer.) comprises at least one of diazine compounds represented by the following formula (5):

(5)

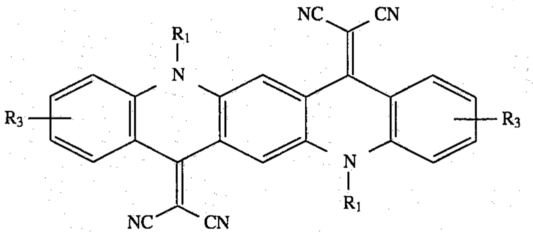

where $R_1$ denotes a hydrogen atom, an alkyl group of from 1 to 18 carbon atoms, an alkoxyalkyl group of from 1 to 8 carbon atoms, or a benzyl group, and $R_3$ denotes a hydrogen atom, a halogen atom, an alkyl group of from 1 to 12 carbon atoms, or an alkoxy group of from 1 to 12 carbon atoms.

According to the present invention, there is obtained an organic EL device capable of stably emitting light at a high luminance with a high efficiency.

DETAILED DESCRIPTION OF PREFERRED EMBODIMENTS

The embodiments according to the present invention will be described in more detail with reference to the accompanying drawings.

Figure 1:
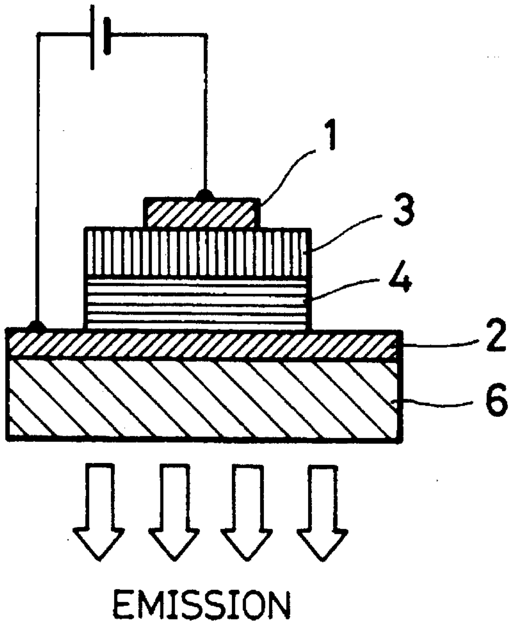
FIG. 1 is a schematic diagram showing an organic EL device with two-layer structure.

The EL device in accordance with the present invention is similar to the two-layer structure shown in FIG. 1 which is formed by layering an anode 2, a positive-hole transport layer 4 of an organic compound, an emitting layer 3 of a specific organic compound below, and a cathode 1 in sequence on a glass substrate 6. Alternatively, another EL device in accordance with the present invention is also similar to the three-layer structure shown in FIG. 2 which is formed by layering an anode 2, an organic positive-hole transport layer 4, an organic emitting layer 3, an organic electron transport layer 5 and a cathode 1 in sequence on a glass substrate 6, the layer 4 or 5 being made a specific organic compound below. In these cases, at least one of the electrodes 1 and 2 may be transparent. The both electrodes may be made of transparent conductive materials. For example, the cathode 1 is formed of metal with a lower work function such as aluminum (Al), magnesium (Mg), indium (In), silver (Ag) or alloys of the individual metals thereof such as Al-Mg, Ag-Mg or the like. The thickness of the cathode may be about 100 through 5000 angstroms. Further, the anode 2 is formed of an electric conductive material with a high work function such as indium-tin oxide (hereinafter referred as "ITO"). The thickness of the anode may be about 1000 through 3000 angstroms. The anode 2 may be formed of gold (Au) with the thickness of 800 through 1500 angstroms. This gold electrode is semi-transparent.

Figure 2:
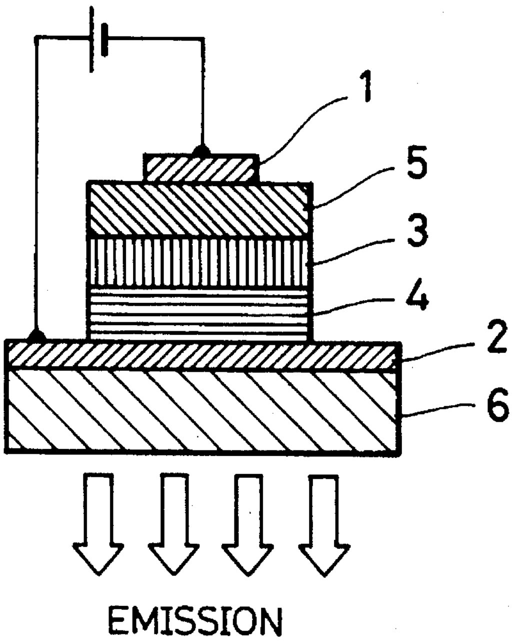
FIG. 2 is a schematic diagram showing an organic EL device with three-layer structure.

The hole transport layer 4 of FIG. 2 is made of triphenylamine derivative represented by the following formula (6). The organic hole transport layer 4 may also be made of a carrier transmitting material (CTM) represented by the following formulas (7) to (17).

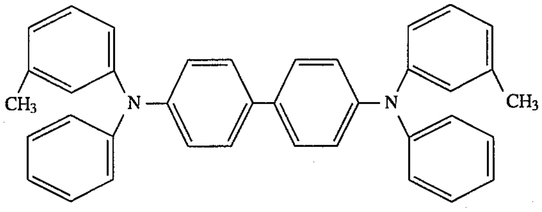

(6)

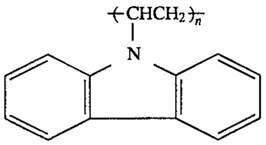

(n = integer)

(7)

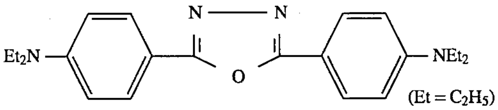

(Et = $C_2H_5$)

(8)

-continued

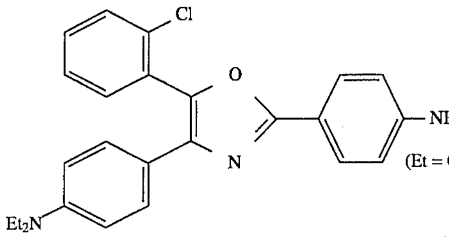

(Et = $C_2H_5$)

(9)

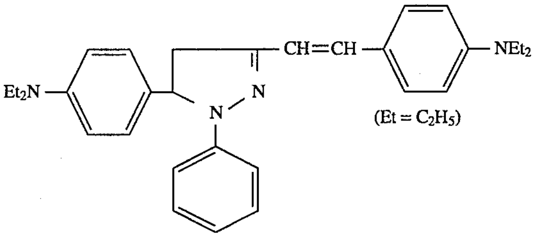

(Et = $C_2H_5$)

(10)

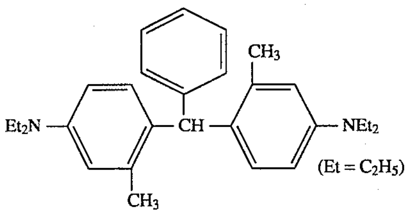

(Et = $C_2H_5$)

(11)

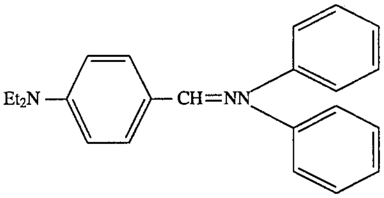

(Et = $C_2H_5$)

(12)

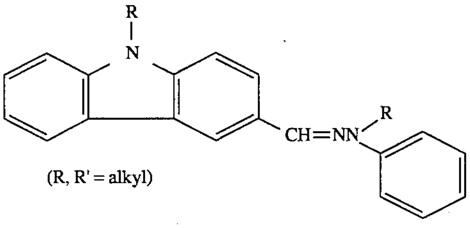

(R, R' = alkyl)

(13)

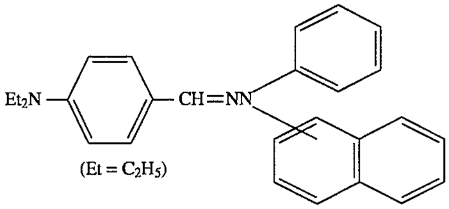

(Et = $C_2H_5$)

(14)

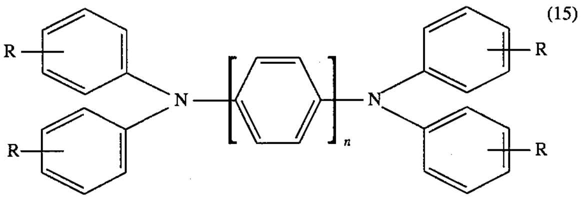

(15)

(n = interger, R = alkyl)

-continued (16)

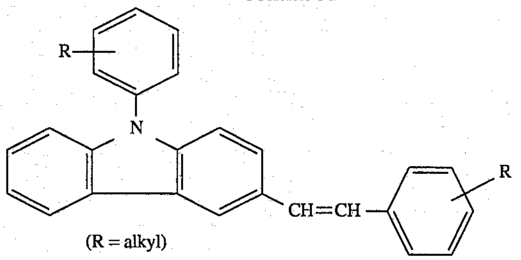

(R = alkyl)

(17)

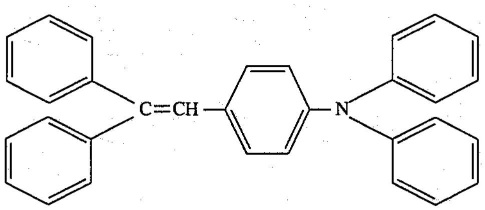

The emitting layer 3 shown in FIG. 2 may be made of an organic host substance and an organic guest substance. The thickness of the emitting layer 3 is approximately 1 micrometer or below. The host substance is preferably selected from tris(8-quinolinol)aluminum (hereinafter referred as "$Al_{q3}$" represent by the following formula (18) and a coumarin compound (hereinafter referred as "C 540") represent by the following formula (19):

(18)

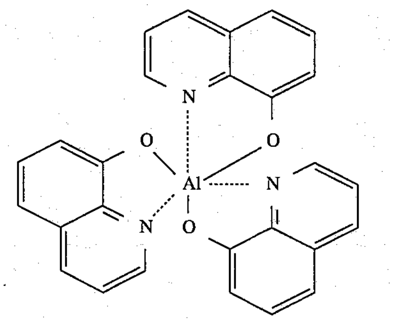

-continued (19)

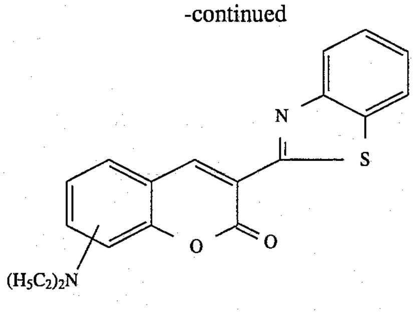

$Al_{q3}$ is preferably used for a electron transport layer. The guest substance is preferably selected from the dioxazine compounds or the diazine compounds represented by the above formulas (1)–(5).

Examples of the dioxazine compounds represented by the above formula (1) used for the electron transport layer or the emitting layer are the following compounds represented by formulas (20)–(26):

(20)

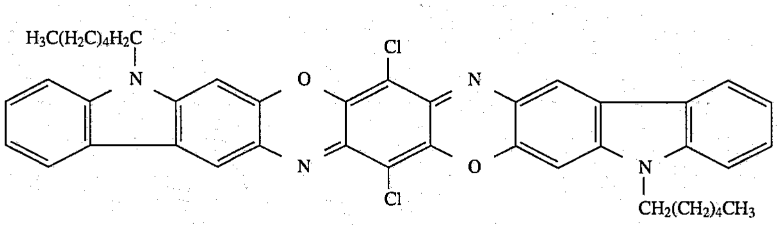

(21)

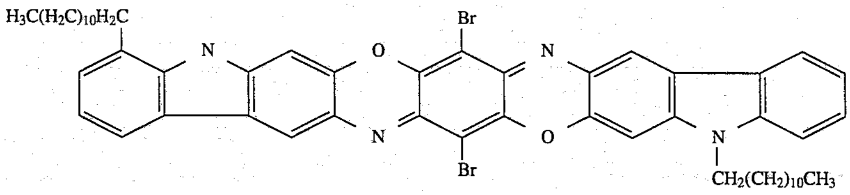

-continued
(22)
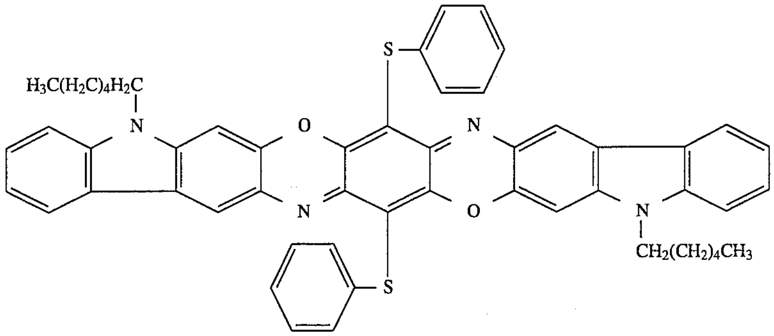
(23)
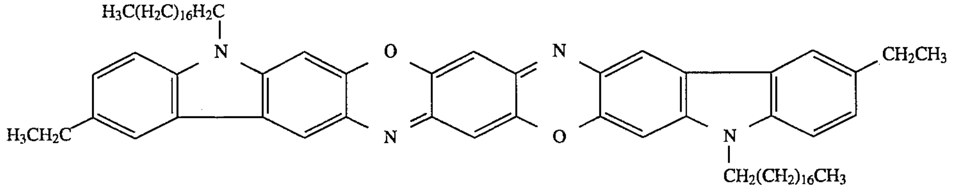
(24)
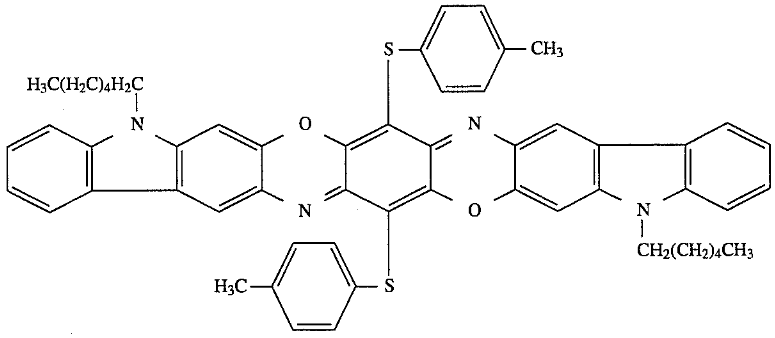
(25)
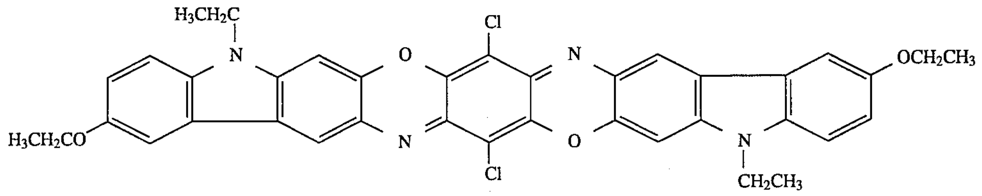
(26)
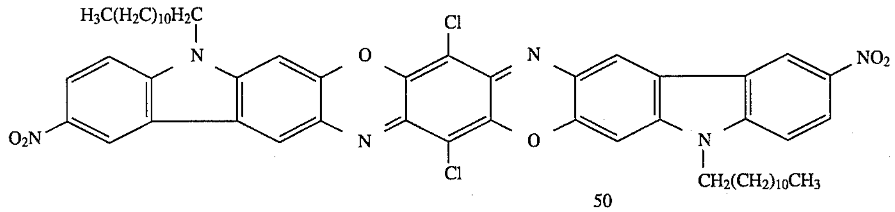
These compounds are obtained by the method described in "Journal of Heterocyclic Chemistry" vol. 27, pp 1575–1579, 1990, using corresponding intermediates.
Examples of the dioxazine compounds represented by the above formula (2) used for the electron transport layer or the emitting layer are the following compounds represented by formulas (27)–(31):

(27)
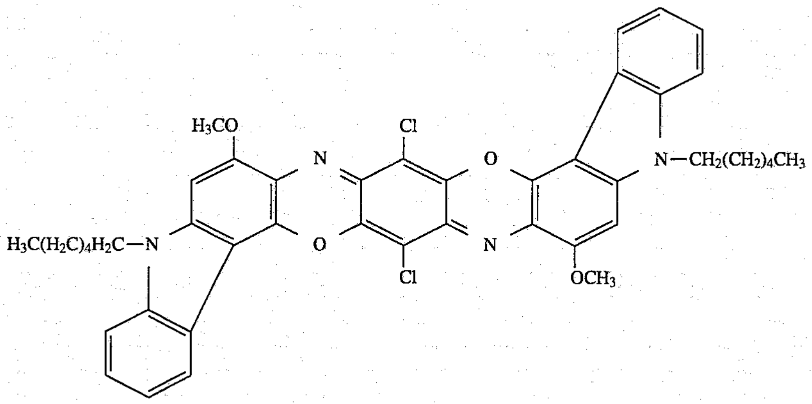
(28)
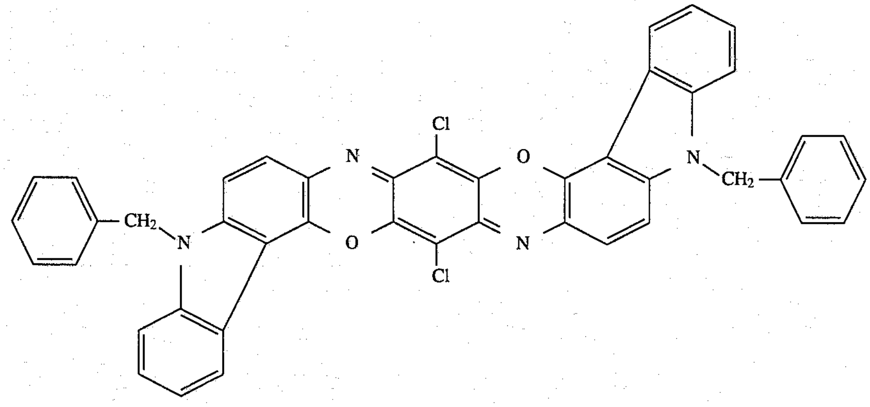
(29)
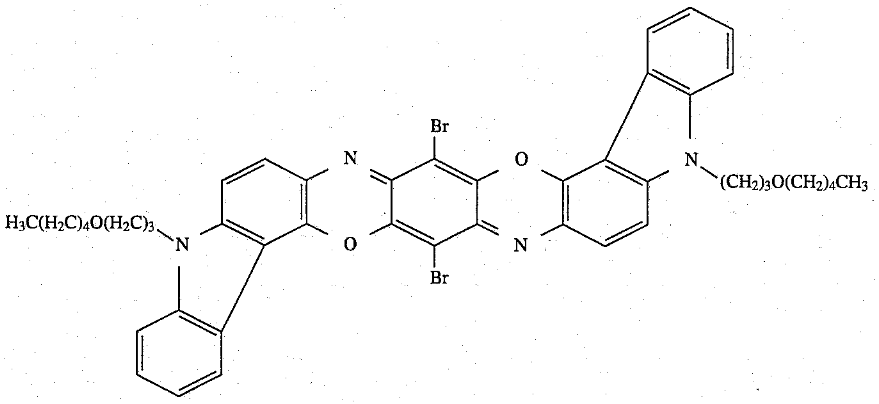
(30)
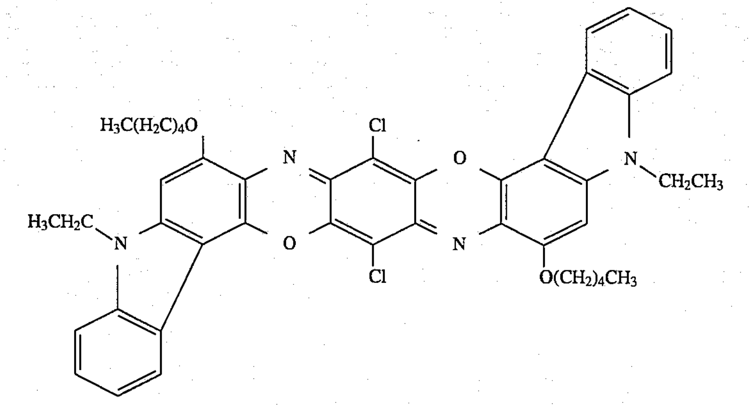

-continued

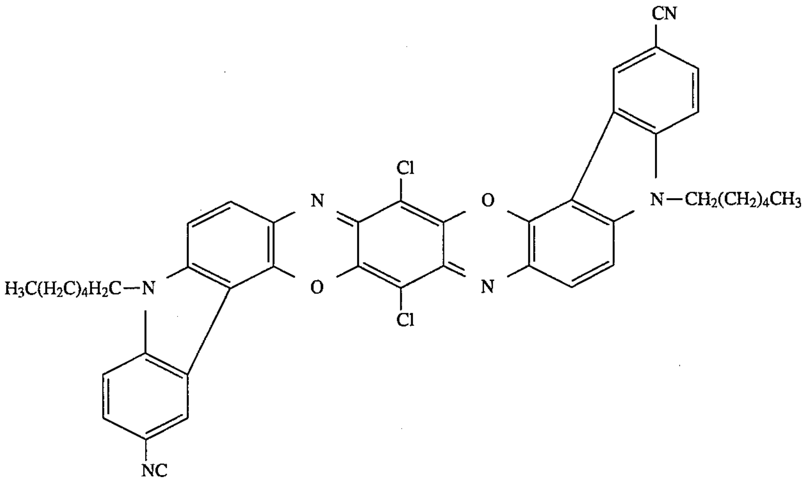

(31)

These compounds are obtained by the method described in "Journal of Heterocyclic Chemistry" vol, 28, pp 1165–1171, 1991, using corresponding intermediates.

Examples of the dioxazine compounds represented by the above formula (3) used for the electron transport layer or the emitting layer are the following compounds represented by formulas (32)–(34):

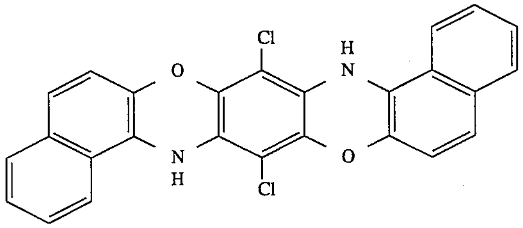

(32)

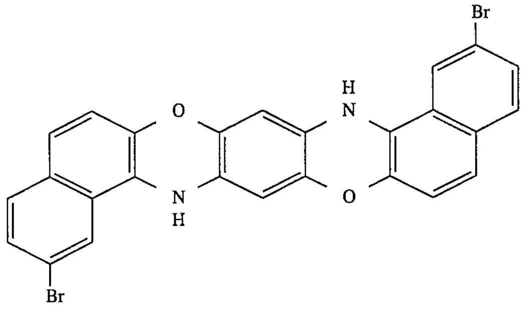

(33)

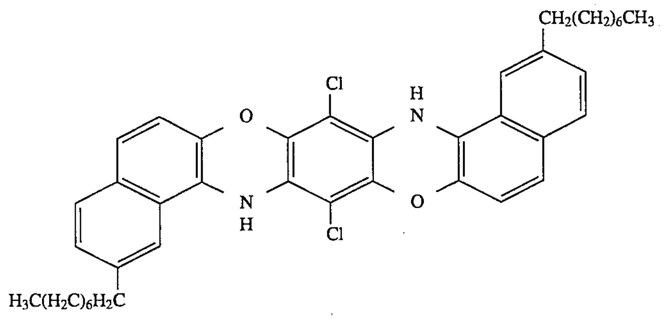

(34)

Examples of the dioxazine compounds represented by the above formula (4) used for the electron transport layer or the emitting layer are the following compounds represented by formulas (35)–(37):

(35)

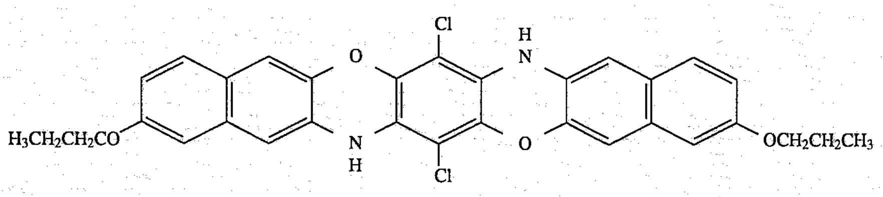

(36)

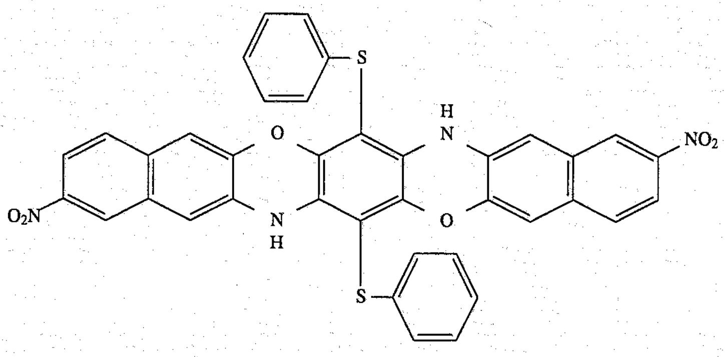

(37)

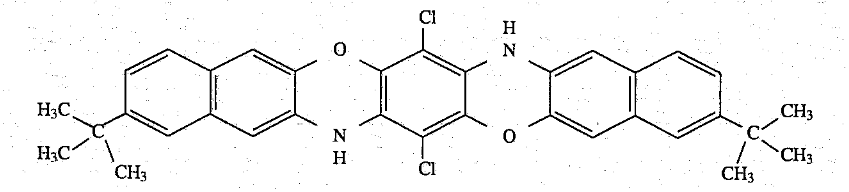

Examples of the diazine compounds represented by the above formula (5) used for the electron transport layer or the emitting layer are the following compounds represented by formulas (38)–(40):

Furthermore, the three-layer EL device further comprising the electron transport layer 5 as shown FIG. 2, has also the same advantageous effect as the two-layer type EL device above mentioned.

(38)

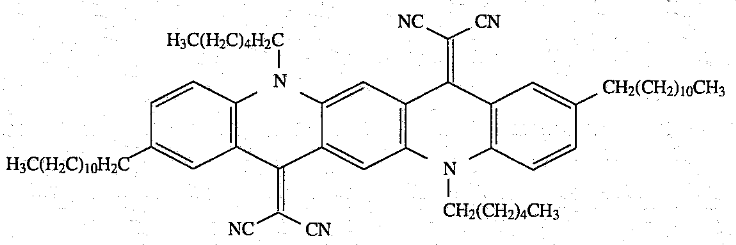

(39)

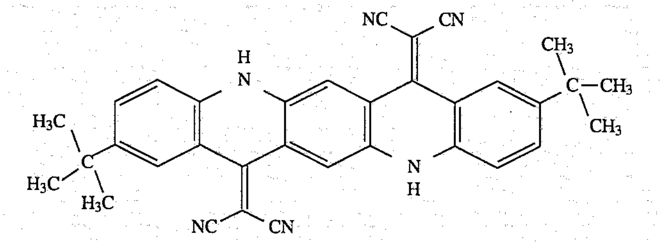

(40)

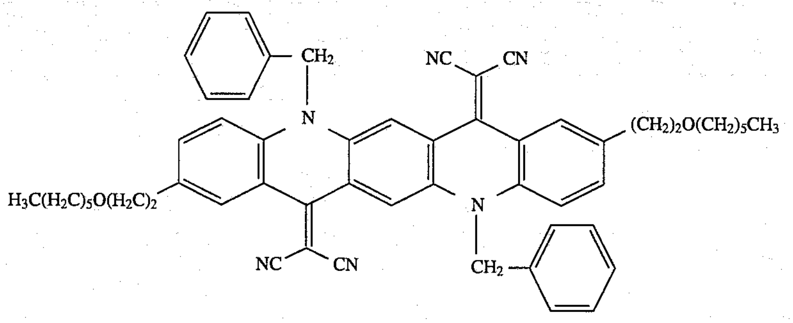

(Example 1)

A glass sub, Crate on which an anode of ITO had been formed at 1500 angstroms thick, was prepared. Each of the following films was formed by a vacuum vapor deposition method at vacuum conditions squat to or less than $1.0\times10^{-5}$ Torr.

First, triphenylamine derivative represented by the above formula (6) for a hole transport layer was deposited on the ITC anode at the thickness of 500 angstroms. Next, $Al_{q3}$ represented by the above formula (18) for host substance and the dioxazine compound (DOX28) represented by the above formula (28) for guest substance were co-deposited as an emitting layer on the hole transport layer with the thickness of 500 angstroms and the volume ratio of $Al_{q3}$:DOX28=100:0.1 by using the corresponding different sources. Then, magnesium and silver for a cathode were vacuum co-deposited on the emitting layer with the thickness of 1100 angstroms.

Figure 3:
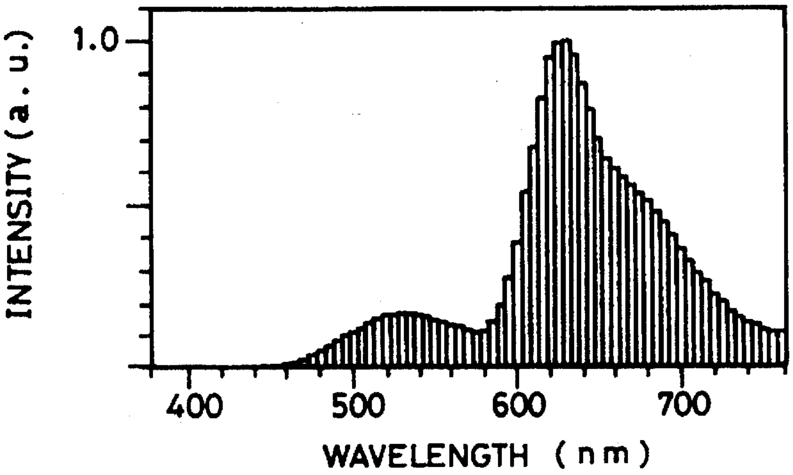
FIGS. 3–12 are graphs showing emission spectrums of organic EL devices of embodiments according to present invention.

When the resultant EL device was operated with the application of the DC voltage 18 V at the constant current density of 0.68 $A/cm^2$, this EL device emitted orange-colored light at luminance of 9940 $cd/m^2$ with the peak wavelength 630 nm of emission spectrum as shown in FIG. 3 (its color purity is x=0.578, y=0.392 in CIE chromaticity diagram (1931)).

(Example 2)

An EL device was assembled by the same procedure as in the Example 1, except that an emitting layer was formed by co-deposition of $Al_{q3}$ of formula (18) and the dioxazine compound (DOX28) of formula (28) at the volume ratio of $Al_{q3}$:DOX28=100:0.8.

Figure 4:
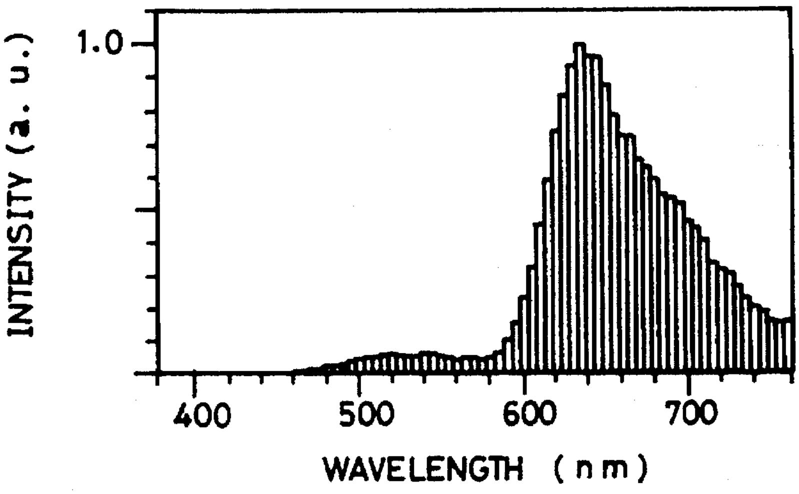

Upon application of 20 V at the constant current density of 0.48 $A/cm^2$, the resultant EL device emitted red-colored light at the luminance of 969 $cd/m^2$ with the peak wavelength 635 nm of emission spectrum shown in FIG. 4 (its color purity is x=0.632, y=0.349 in CIE chromaticity diagram (1931)).

(Example 3)

An EL device was assembled by the same procedure as in the Example 1, except that an emitting layer was formed by co-deposition of $Al_{q3}$ of formula (18) and the dioxazine compound (DOX28) of formula (28) at the volume ratio of $Al_{q3}$:DOX28=100:2.0.

Figure 5:
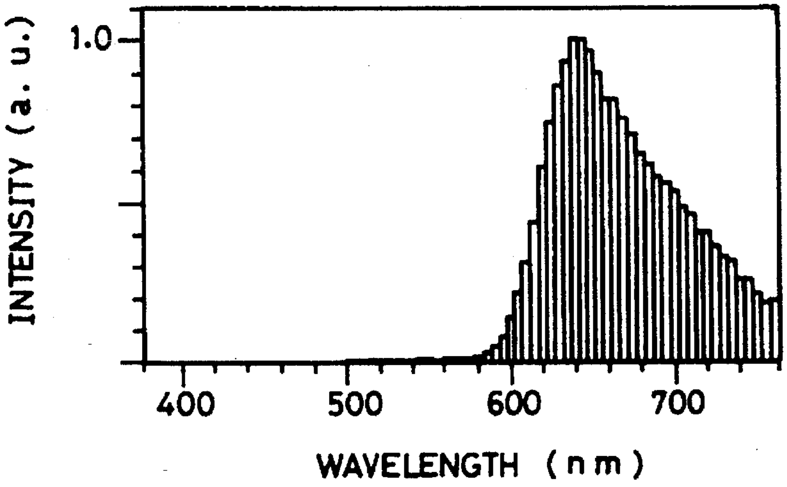

Upon application of 25 V at the constant current density of 0.48 $A/cm^2$, the resultant EL device emitted deep red-colored light at the luminance of 294 $cd/m^2$ with the peek wavelength 645 nm of emission spectrum shown in FIG. 5 (its color purity is x=0.686, y=0.310 in CIE chromaticity diagram (1931)).

(Comparative example 1)

An EL device was assembled by the same procedure as in Example 1, except that the emitting layer of 500 angstroms was formed by co-deposition of $Al_{q3}$ of formula (18) and the pyran compound (DCM) represented by the following formula (41) at the volume ratio of $Al_{q3}$:DOX28=100:2.0.

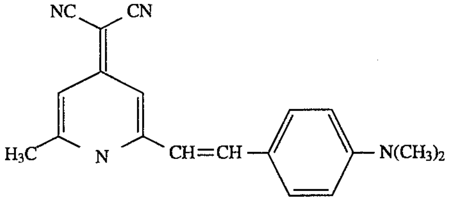

(41)

Figure 13:
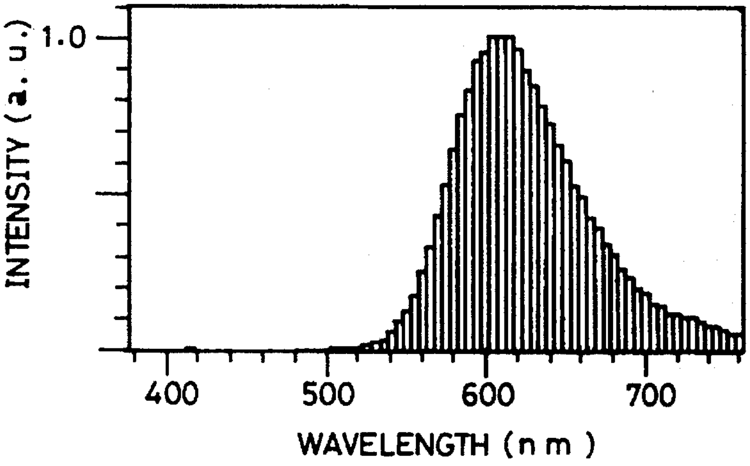
FIG. 13–19 are graphs showing emission spectrums of organic EL devices of comparative examples.

Upon application of 19 V at the constant current density of 0.53 $A/cm^2$, the resultant EL device emitted orange-colored light at the luminance of 1516 $cd/m^2$ with the peak wavelength 610 nm of emission spectrum shown in FIG. 13 (its color purity is x=0.601, y=0.398 in CIE chromaticity diagram (1931)).

Comparative example 2)

An EL device was assembled by the same procedure An the Example 1, except that the emitting layer was formed by co-deposition of $Al_{q3}$ of formula (18) and the pyran compound (DCM) of formula (41) at the volume ratio of $Al_{q3}$:DCM=100:2.5.

Figure 14:
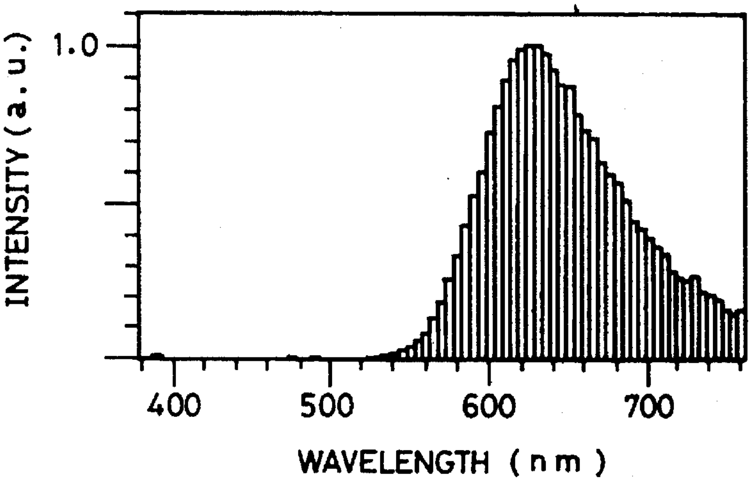

Upon application of 18 V at the constant current density of 0.69 $A/cm^2$, the resultant EL device emitted red-colored light at the luminance of 978 $cd/m^2$ with the peak wavelength 625 nm of emission spectrum shown in FIG. 14 (its color purity is x=0.634, y=0.361 in CIE chromaticity diagram (1931)).

(Comparative example 3)

An EL device was assembled by the same procedure in the Example 1, except that the emitting layer was formed by co-deposition of $Al_{q3}$ of formula (18) and the pyran compound (DOM) of formula (41) at the volume ratio of $Al_{q3}$:DCM=100:3.2.

Figure 15:
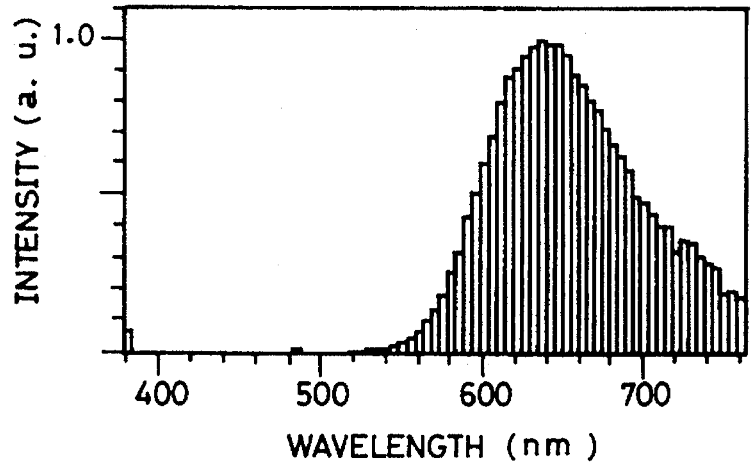

Upon application of 17 V at the constant current density of 0.74 $A/cm^2$, the resultant EL device emitted red-colored light at the luminance of 768 $cd/m^2$ with the peak wavelength 635 nm of emission spectrum shown in FIG. 15 (its color purity is x=0.646, y=0.353 in CIE chromaticity diagram (1931)).

(Example 4)

An EL device was assembled by the same procedure as in the Example 1, except that an emitting layer with 400 angstroms thickness was formed by co-deposition of C540 represent by the above formula (19) and the dioxazine compound (DOX28) of formula (28) at the volume ratio of C540:DOX28=100:0.5 and then an electron transport layer of $Al_{q3}$ of formula (18) with 200 angstroms thickness was deposited on the emitting layer.

Figure 6:
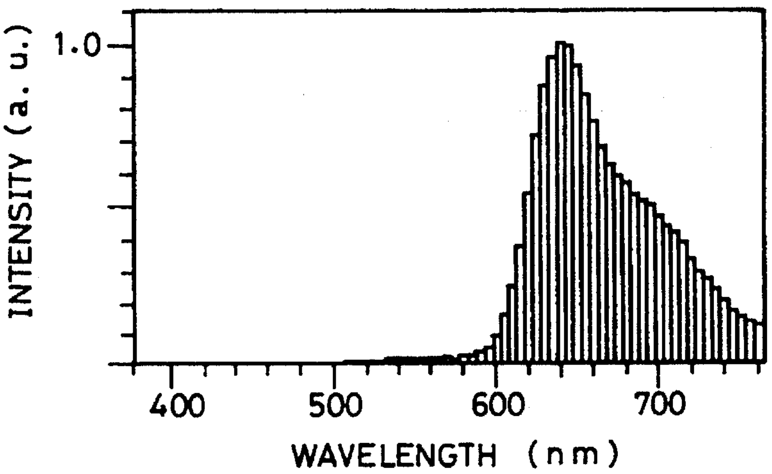

Upon application of 13 V at the constant current density of 0.60 $A/cm^2$, the resultant EL device emitted deep red-colored light at the luminance of 4780 $cd/m^2$ with the peek wavelength 640 nm of emission spectrum shown in FIG. 6 (its color purity is x=0.682, y=0.314 in CIE chromaticity diagram (1931)).

(Example 5)

An EL device was assembled by the same procedure as in the Example 4, except that an emitting layer was formed by co-deposition of C540 represent by the above formula (19) and the dioxazine compound (DOX20) of formula (20) at the volume ratio of C540:DOX20=100:1.0.

Figure 7:
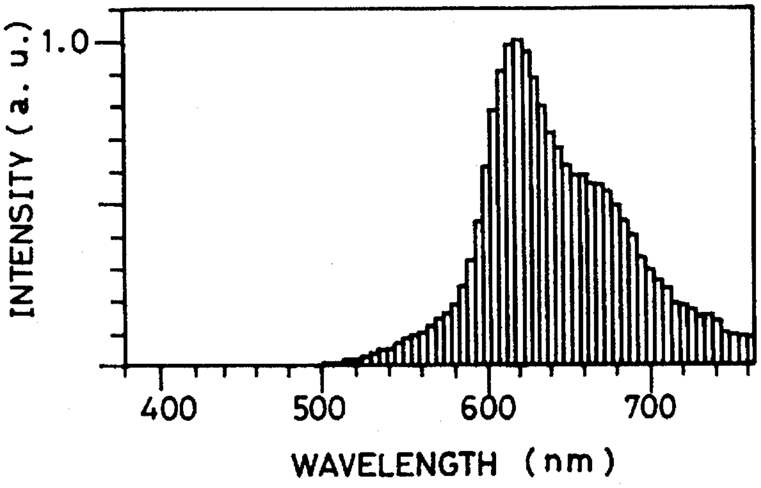

Upon application of 15 V at the constant current density of 0.52 $A/cm^2$, the resultant EL device emitted red-colored light at the luminance of 4250 $cd/m^2$ with the peak wavelength 620 nm of emission spectrums, shown in FIG. 7 (its color purity is x=0.631, y=0.367 in CIE chromaticity diagram (1931)).

(Example 6)

An EL device was assembled by the same procedure as in the Example 4, except that an emitting layer was formed by co-deposition of C540 represent by the above formula (19) and the dioxazine compound (DOX20) of formula (20) at the volume ratio of C540:DOX20=100:1.5.

Figure 8:
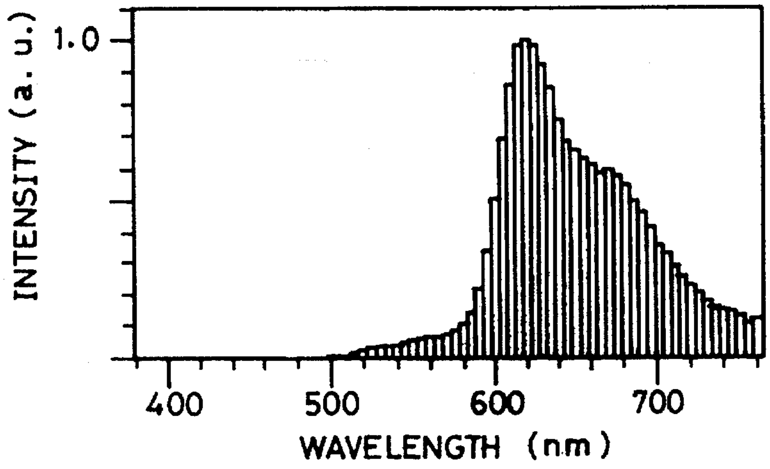

Upon application of 14 V at the constant current density of 0.60 $A/cm^2$, the resultant EL device emitted red-colored light at the luminance of 2480 $cd/m^2$ with the peak wavelength 620 nm of emission spectrum shown in FIG. 8 (its color purity is x=0.647, y=0.351 in CIE chromaticity diagram (1931)).

(Example 7)

An EL device was assembled by the same procedure as in the Example 4, except that an emitting layer was formed by co-deposition of C540 represent by the above formula (19) and the dioxazine compound (DOX20) of formula (20) at the volume ratio of C540:DOX20=100:3.5.

Figure 9:
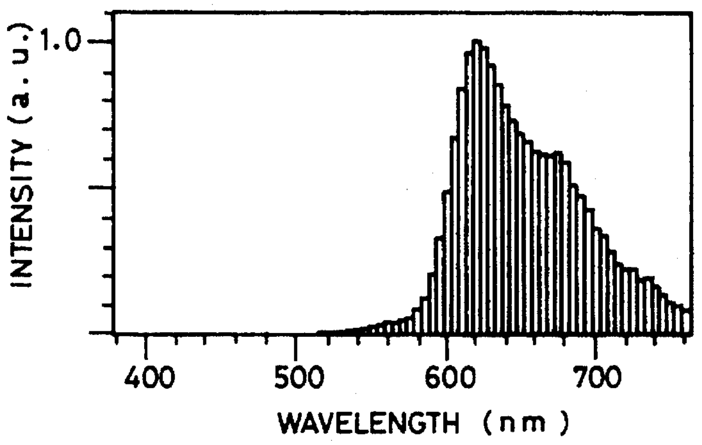

Upon application of 18 V at the constant current density of 0.48 A/$cm^2$, the resultant EL device emitted deep red-colored light at the luminance of 1001 cd/$m^2$ with the peak wavelength 620 nm of emission spectrum shown in FIG. 9 (its color purity is x=0.660, y=0.339 in CIE chromaticity diagram (1931)).

(Example 8)

An EL device was assembled by the same procedure as in the Example 4, except that an emitting layer was formed by co-deposition of C540 represent by the above formula (19) and the dioxazine compound (DOX38) of formula (38) at the volume ratio of C540:DOX38=100:0.8.

Figure 10:
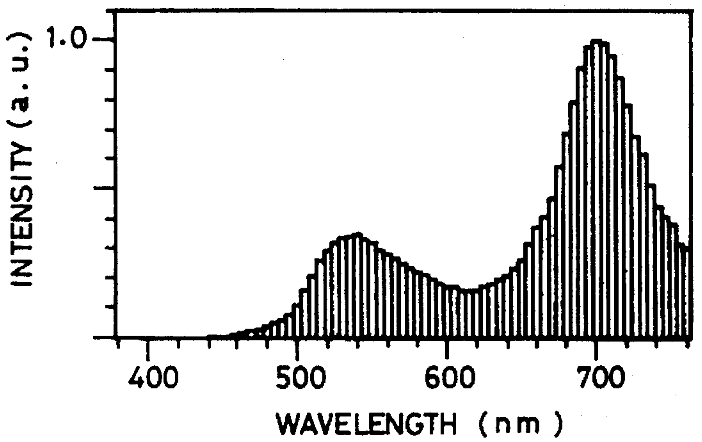

Upon application of 14 V at the constant current density of 0.81 A/$cm^2$, the resultant EL device emitted yellowish green-colored light at the luminance of 727 cd/$m^2$ with the peak wavelength 700 nm of emission spectrum shown in FIG. 10 (its color purity is x=0.418, y=0.537 in CIE chromaticity diagram (1931)).

(Example 9)

An EL device was assembled by the same procedure as in the Example 4, except that an emitting layer was formed by co-deposition of C540 represent by the above formula (19) and the dioxazine compound (DOX38) of formula (38) at the volume ratio of C540:DOX38=100:2.4.

Figure 11:
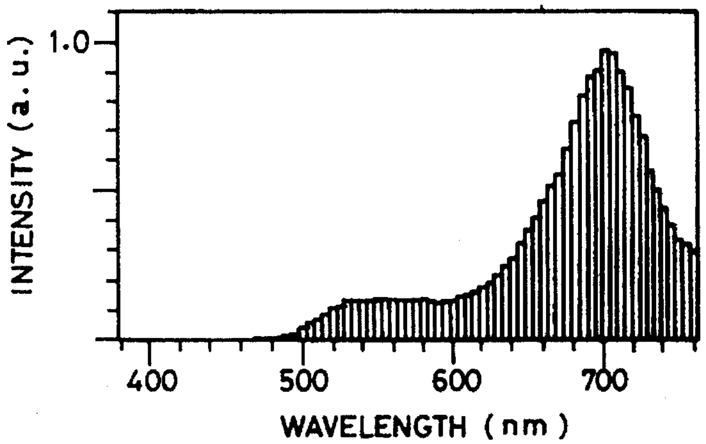

Upon application of 17 V at the constant current density of 0.77 A/$cm^2$, the resultant EL device emitted yellow-colored light at the luminance of 386 cd/$m^2$ with the peak wavelength 700 nm of emission spectrum shown in FIG. 11 (its color purity is x=0.512, y=0.465 in CIE chromaticity diagram (1931)).

(Example 10)

An EL device was assembled by the same procedure as in the Example 4, except that an emitting layer was formed by co-deposition of C540 represent by the above formula (19) and the dioxazine compound (DOX32) of formula (32) at the volume ratio of C540:DOX32=100:0.5.

Figure 12:
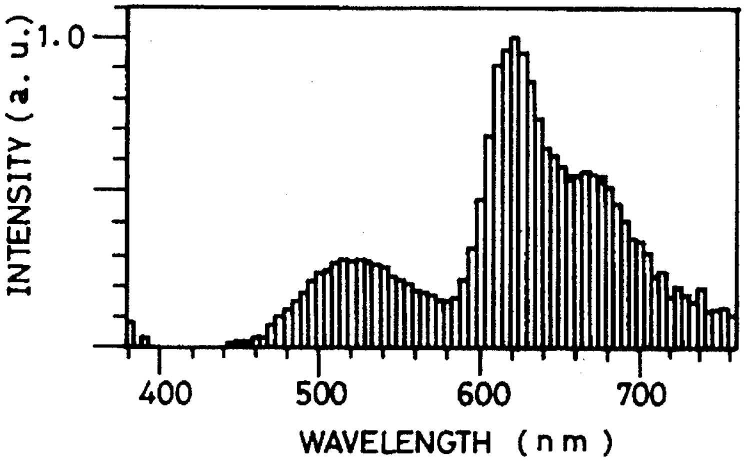

Upon application of 18 V at the constant current density of 0.67 A/$cm^2$, the resultant EL device emitted orange-colored light at the luminance of 196 cd/$m^2$ with the peak wavelength 620 nm of emission spectrum shown in FIG. 12 (its color purity is x=0.523, y=0.418 in CIE chromaticity diagram (1931)).

(Comparative example 4)

An EL device was assembled by the same procedure as in the Example 4, except that an emitting layer was formed by co-deposition of C540 represent by the above formula (19) and DCM of formula (41) at the volume ratio of C540:DCM=100:0.2.

Figure 16:
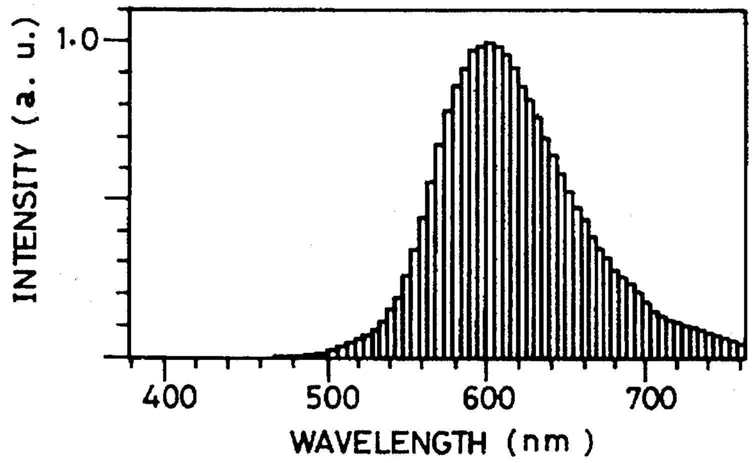

Upon Application of 17 V at the constant current density of 0.43 A/$cm^2$, the resultant EL device emitted orange-colored light at the luminance of 7360 cd/$m^2$ with the peak wavelength 600 nm of emission spectrum shown in FIG. 16 (its color purity is x=0.567, y=0.429 in CIE chromaticity diagram (1931)).

(Comparative example 5)

An EL device was assembled by the same procedure as in the Example 4, except that an emitting layer was formed by co-deposition of C540 represent by the above formula (19) and DCM of formula (41) at the volume ratio of C540; :DCM=100:0.7.

Figure 17:
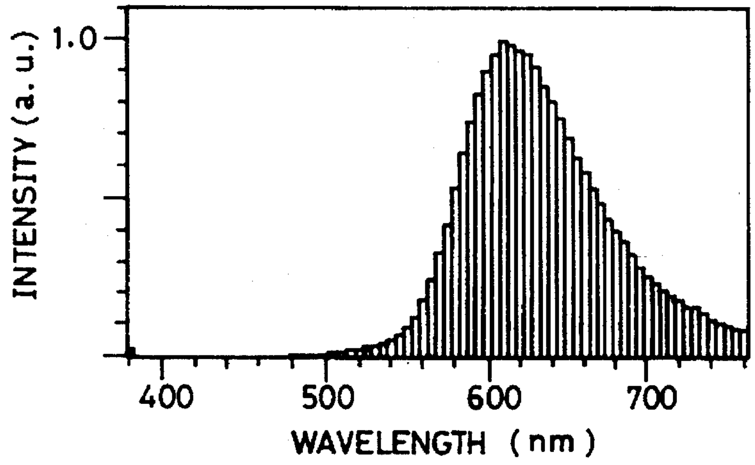

Upon application of 18 V at the constant current density of 0.49 A/$cm^2$, the resultant EL device emitted orange-colored light at the luminance of 5020 cd/$m^2$ with the peak wavelength 610 nm of emission spectrum shown in FIG. 17 (its color purity is x=0.609, y=0.389 in CIE chromaticity diagram (1931)).

(Comparative example 6)

An EL device was assembled by the same procedure as in the Example 4, except that an emitting layer was formed by co-deposition of C540 represent by the above formula (19) and DCM of formula (41) at the volume ratio of C540:DCM=100:1.2.

Figure 18:
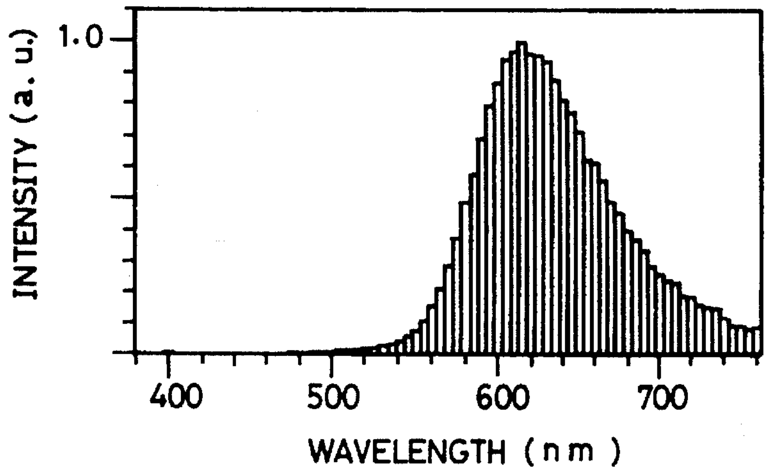

Upon application of 20 V at the constant current density of 1.20 A/$cm^2$, the resultant EL device emitted orange-colored light at the luminance of 4690 cd/$m^2$ with the peak wavelength 615 nm of emission spectrum shown in FIG. 18 (its color purity is x=0.615, y=0.382 in CIE chromaticity diagram (1931)).

(Comparative example 7)

An EL device was assembled by the same procedure as in the Example 4, except that an emitting layer was formed by co-deposition of C540 represent by the above formula (19) and DCM of formula (41) at the volume ratio of C540:DCM=100:2.7.

Figure 19:
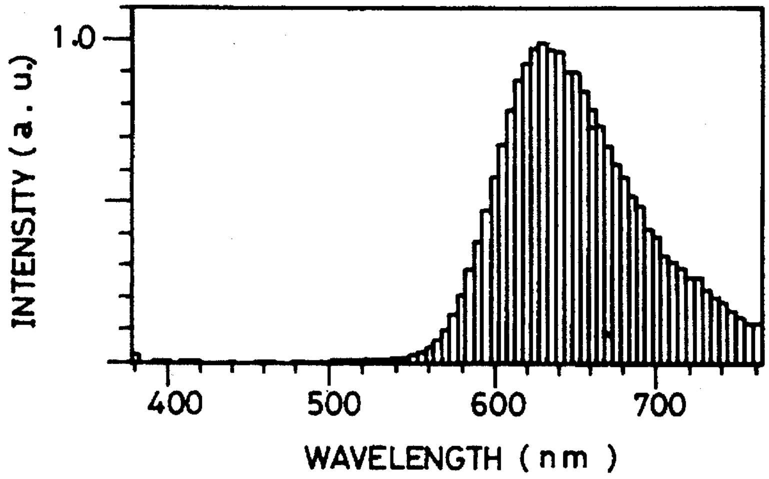

Upon application of 19 V at the constant current density of 0.38 A/$cm^2$, the resultant EL device emitted red-colored light at the luminance of 2620 cd/$m^2$ with the peak wavelength 630 nm of emission spectrum shown in FIG. 19 (its color purity is x=0.646, y=0.350 in CIE chromaticity diagram (1931)).

As described above, the organic EL device according to the present invention comprises an anode, a positive-hole transport layer, an emitting layer, and cathode which are layered in sequence, wherein the emitting layer (this should be read as "the emitting layer or the electron transport layer" when the device further comprises an electron transport layer interposed between the cathode and the emitting layer.) comprises at least one of dioxazine compounds or diazine compounds represented by the above formulas (1)–(5). Thus, it is possible according to the present invention to improve the emitting capability of the organic EL device which emits light at a high luminance and a high efficiency upon application of a low voltage for a long time.

What is claimed is:

1. An organic EL device comprising an anode, a positive-hole transport layer made of an organic compound, an emitting layer made of an organic host substance, optionally an electron transport layer, and a cathode which are layered in sequence, wherein one or both of said electron transport layer and the emitting layer, in addition to the organic host substance comprises a dioxazine compound represented by the following formula (1):

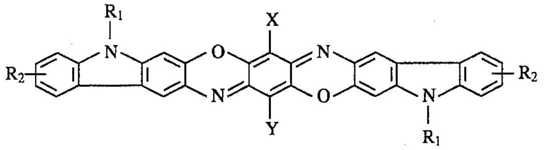

(1)

where X and Y denote independently a hydrogen atom, a halogen atom, or a methyl substituted or unsubstituted phenylthiol group, $R_1$ denotes a hydrogen atom, an alkyl group of from 3 to 18 carbon atoms, an alkoxyalkyl group of from 1 to 8 carbon atoms, or a benzyl group, and $R_2$ denotes a hydrogen atom, a halogen atom, a cyano group, a nitro group, an alkyl group of from 1 to 8 carbon atoms, or an alkoxy group of from 1 to 5 carbon atoms.

2. An organic electroluminescent device according to claim 1, comprising the electron transport layer.

3. A device according to claim 2, wherein the electron transport layer comprises a dioxazine compound of the formula (1).

4. A device according to claim 1, wherein the emitting layer comprises a dioxazine compound of the formula (1).

5. An organic EL device comprising an anode, a positive-hole transport layer made of an organic compound, an emitting layer made of an organic host substance, optionally an electron transport layer, and a cathode which are layered in sequence, wherein one or both of said electron transport layer and the emitting layer, in addition to the organic host substance comprises a dioxazine compound represented by the following formula (2):

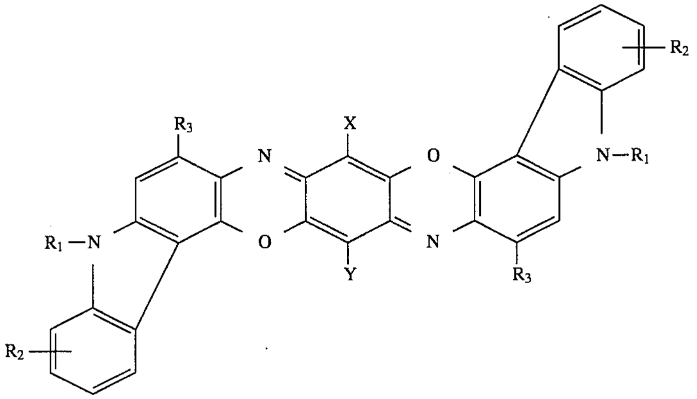

(2)

where X and Y denote independently a hydrogen atom, a halogen atom, or a methyl substituted or unsubstituted phenylthiol group, $R_1$ denotes a hydrogen atom, an alkyl group of from 3 to 18 carbon atoms, an alkoxyalkyl group of from 1 to 8 carbon atoms, or a benzyl group, $R_2$ denotes a hydrogen atom, a halogen atom, a cyano group, a nitro group, an alkyl group of from 1 to 8 carbon atoms, or an alkoxy group of from 1 to 5 carbon atoms, and $R_3$ denotes a hydrogen atom, a halogen atom, an alkyl group of from 1 to 12 carbon atoms, or an alkoxy group of from 1 to 12 carbon atoms.

6. An organic electroluminescent device according to claim 5, comprising the electron transport layer.

7. A device according to claim 6, wherein the electron transport layer comprises a dioxazine compound of the formula (2).

8. A device according to claim 5, wherein the emitting layer comprises a dioxazine compound of the formula (2).

9. An organic EL device comprising an anode, a positive-hole transport layer made of an organic compound, an emitting layer made of an organic host substance, optionally an electron transport layer, and a cathode which are layered in sequence, wherein one or both of said electron transport layer and the emitting layer, in addition to the organic host substance comprises a dioxazine compound represented by the following formula (3):

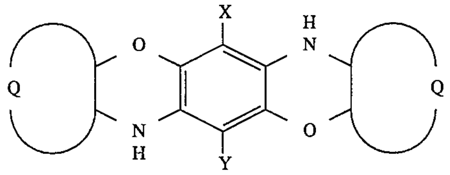

(3)

where X and Y denote independently a hydrogen atom, a halogen atom, or a methyl substituted or unsubstituted phenylthiol group, and Q denotes a residual group of naphthalene ring substituted or unsubstituted by a hydrogen atom, a halogen atom, a cyano group, a nitro group, an alkyl group of from 1 to 8 carbon atoms, or an alkoxy group of from 1 to 5 carbon atoms.

10. An organic electroluminescent device according to claim 9, wherein said dioxazine compound represented by the above formula (3) includes one represented by the following formula (4):

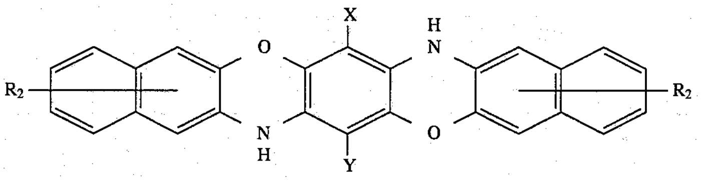

(4)

where X and Y denote independently a hydrogen atom, a halogen atom, or a methyl substituted or unsubstituted phenylthiol group, and $R_2$ denotes a hydrogen atom, a halogen atom, a cyano group, a nitro group, an alkyl group of from 1 to 8 carbon atoms, or an alkoxy group of from 1 to 5 carbon atoms.

11. An organic electroluminescent device according to claim 9, comprising the electron transport layer.

12. A device according to claim 11, wherein the electron transport layer comprises a dioxazine compound of the formula (3).

13. A device according to claim 9, wherein the emitting layer comprises a dioxazine compound of the formula (3).

14. An organic EL device comprising an anode, a positive-hole transport layer made of an organic compound, an emitting layer made of an organic host substance, optionally an electron transport layer, and a cathode which are layered in sequence, wherein one or both of said electron transport layer and the emitting layer, in addition to the organic host substance comprises a diazine compound represented by the following formula (5):

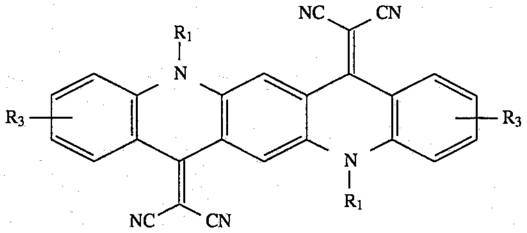

(5)

where $R_1$ denotes a hydrogen atom, an alkyl group of from 1 to 18 carbon atoms, an alkoxyalkyl group of from 1 to 8 carbon atoms, or a benzyl group, and $R_3$ denotes a hydrogen atom, a halogen atom, an alkyl group of from 1 to 12 carbon atoms, or an alkoxy group of from 1 to 12 carbon atoms.

15. An organic electroluminescent device according to claim 14, comprising the electron transport layer.

16. A device according to claim 15, wherein the electron transport layer comprises a diazine compound of the formula (5).

17. A device according to claim 14, wherein the emitting layer comprises a diazine compound of the formula (5).

* * * * *